July 12, 1932.  J. O. BAILEY  1,867,245
VERTICAL CONVEYER ELEVATOR
Filed Sept. 6, 1930   2 Sheets-Sheet 1
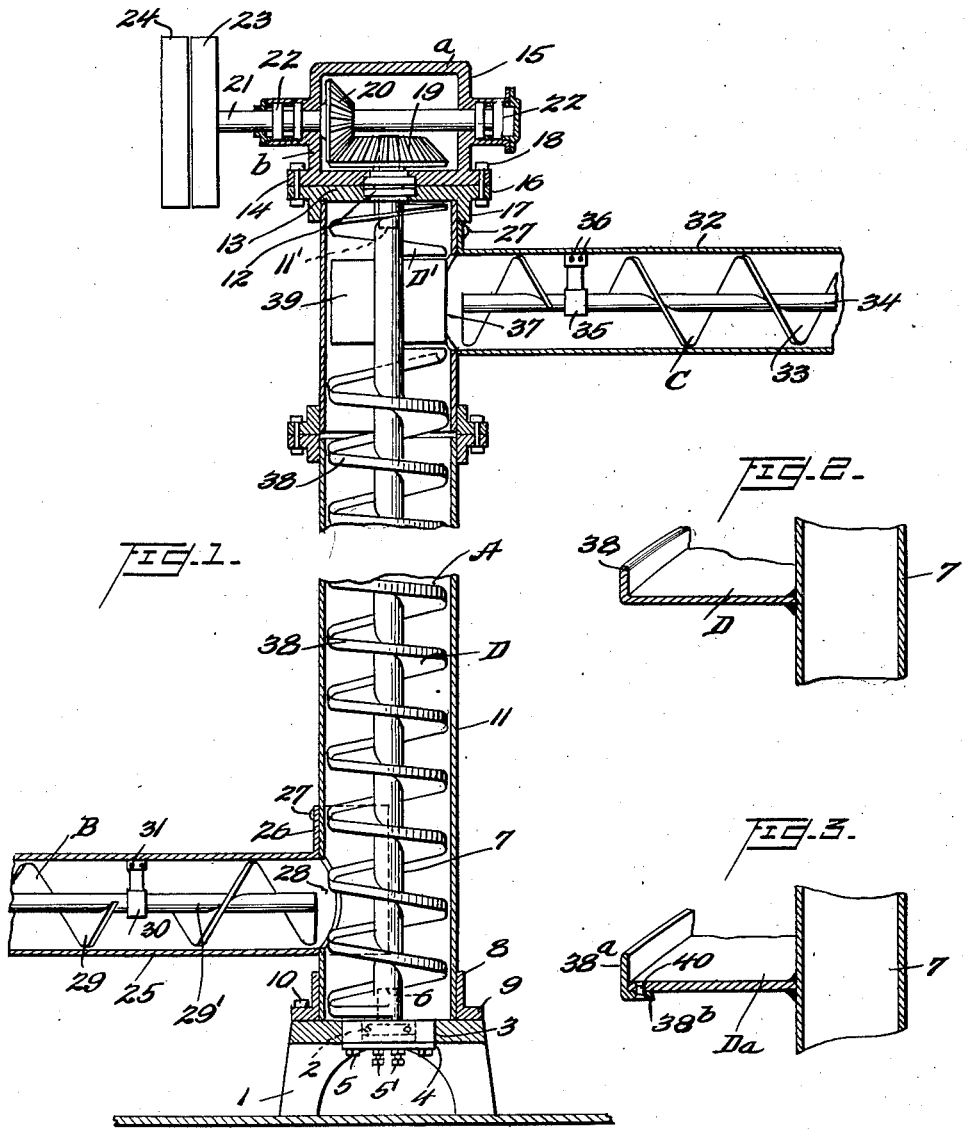
Inventor
Joseph Oswell Bailey
By Shreve, Crowe & Gordon
Attorneys July 12, 1932.　　　J. O. BAILEY　　　1,867,245
VERTICAL CONVEYER ELEVATOR
Filed Sept. 6, 1930　　　2 Sheets-Sheet 2
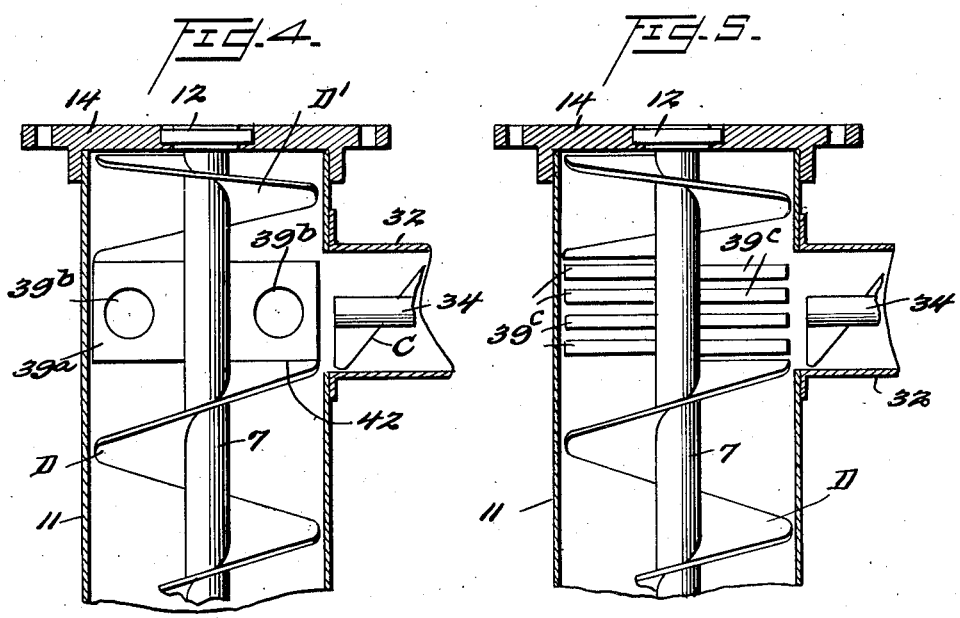

Patented July 12, 1932

1,867,245

UNITED STATES PATENT OFFICE

JOSEPH OSWELL BAILEY, OF ATLANTA, GEORGIA

VERTICAL CONVEYER ELEVATOR

Application filed September 6, 1930. Serial No. 480,241.

Generically this invention relates to elevators, but it more especially comprehends the type adaptable for the elevation of granular materials, as, cement, ocher, phosphate, fertilizer, lime, mica, graphite, salt, sugar, glucose, grain, cotton seed, dry liquid materials, embodying an endless screw or spiral flight elevating medium.

One of the principal objects of this invention is the provision of a vertically disposed helicoidal endless cupped flight elevating conveyer, the peripheral edge of the conveyer blade terminating in a lateral flange, whereby the packing down and resistance of the upward flow of the material being conveyed is greatly reduced.

Another important object of this invention is the provision of a vertically disposed endless screw flight conveyer having an angle iron element bolted or otherwise suitably secured to the flight along its peripheral edge, constituting a vertical flange at right angles to the conveyer blade, forming a cupped flight conveyer for effecting a better holding of the material as it flows to said vertical conveyer and facilitating the upward flow movement at the point where congestion is most likely to occur, and for other reasons above stated.

A further important object of this invention is the provision of a vertically disposed tubular casing having an inlet adjacent its lower end and an outlet spaced from its upper end and having mounted therein a vertically disposed helicoid endless flight elevating conveyer terminating below the said outlet and a similar helicoid section above said outlet having its flights extending in the opposite direction and one or more paddles mounted intermediate or interconnecting said opposite flight sections adjacent said outlet opening, whereby packing of the conveyed material above and at the mouth of the said outlet is prevented and positive discharge of such materials to the outlet is effected.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a vertical section of my improved conveyer flight operatively positioned and with intake and discharge conveyers shown in fragmentary vertical section.

Fig. 2 is a detailed fragmentary vertical section showing the conveyer flight terminating in an integral peripheral flange.

Fig. 3 is a similar detailed view of a modified form, showing the flange detachably connected to the flight.

Fig. 4 is a fragmentary vertical section of the upper end of casing with a portion of the conveyer in elevation showing a modified form of paddle.

Fig. 5 is a similar view showing a slightly different paddle element.

Conveyers of this type heretofore in use and with which I am familiar have proven deficient in permitting packing of the material and thereby causing congestion at the point of pick-up, permitting wedging of the material against the casing wall, requiring more power to operate, and not effecting clearance from the discharge point of the horizontal feeding conveyer to the bottom of the vertical elevator conveyer; and it was to overcome such deficiencies, and to provide a cupped flight conveyer for effecting a more uniform flow, avoiding packing and aiding holding of the material as it flows to the vertical conveyer, thereby facilitating the upward flow movement at the point where it is most necessary and where congestion is most likely to occur, adapted to clear itself from discharge point of the horizontal feeding conveyer to the bottom of the vertical elevator conveyer, and by the employment of a short pitch conveyer facilitating an easy climb for the stock, reducing the packing down and resistance of the upward flow, feeding in opposite directions to the outlet, and thereby preventing jamming of the material and requiring less motive power, that I designed the cupped flight endless spiral conveyer forming the subject matter of this invention.

In the illustrated embodiment characterizing this invention there is shown a conveyer elevator A, an intake conveyer B, and a discharge conveyer C, which components will hereafter be described.

The elevator A comprises a base 1, in which is suitably mounted a ball-bearing assembly 2, encased by housing 3, having an end plate 4 secured by bolts 5 or in any suitable manner. Extending through said base and end plate 4, and engaging the under surface of bearing 2 are a pair of spaced adjusting bolts 5', for raising or lowering the conveyer and adjusting the thrust bearings 2. A stub shaft 6 is adapted to be vertically journaled in bearings 2 and adapted to extend within the lower end of conveyer elevator shaft 7, to which it is firmly secured in any well known manner. An annular shield collar plate 8 having a lateral flange 9 is adapted to rest on and be secured to base 1 by bolts 10 or other suitable fastening elements. A tubular vertically disposed casing 11 is adapted to seat in said collar, having its lower end suitably secured thereto. The upper end of the said shaft 7 is adapted to receive the lower end of stub shaft 11 suitably locked therein, and journaled in ball-bearings 12, mounted in stuffing box 13 formed in the lower portion 14 of gear housing 15, and the lower flanged portion 14 and the upper flanged portion 16 of shield collar 17, said members 14 and 16 being secured by bolts 18 or in any well known manner.

Mounted on the upper end of stub shaft 11 and suitably secured thereto is bevel gear 19 adapted to mesh with bevel gear 20, extending at right angles to shaft 7 and journaled in ball-bearings 22 mounted at opposite ends and within closure 15, said closure being formed with upper and lower sections $a$ and $b$, respectively, secured together in any well known manner, the free end of pulley shaft 21 having suitably mounted thereon tight and loose pulleys 23 and 24, respectively, by means of which power is transmitted to said shaft 21.

Coming now to the second component there is shown a feeder or intake conveyer B comprising a longitudinally disposed tubular casing 25 extending at right angles to the vertical casing 7 terminating in an arcuate end member 26 extending at right angles thereto and adapted to engage the outer surface of casing 7 and secured thereto by rivets 27 or other suitable fastening elements, so that the open end of said casing 25 registers with aperture 28 formed in the side of casing 7 spaced from its lower end, as will be clear without further discussion. Mounted in said casing 25 is an endless spiral conveyer 29 mounted on shaft 29' journaled in hanger 30 suitably secured within said casing as at 31, said conveyer adapted to deliver the grain or other material to be elevated to casing 11 for a purpose hereinafter more fully appearing.

Coming now to the third component there is shown a discharge conveyer C comprising a tubular casing 32 having suitably mounted therein an endless conveyer 33 suitably mounted on shaft 34 journaled in the hanger 35 secured within the casing by bolts or rivets 36, all similar to the components of conveyer B terminating in a similar member 26 secured by rivets or bolts 27 overlying opening 37, whereby the conveyed material is discharged from casing 7 into casing 32 to be discharged at a suitable point, as will hereinafter more fully appear.

One of the principal features of this invention will now be described, namely, the endless spiral conveyer blade D mounted on shaft 7 substantially throughout its length and having its cord face integrally welded to said shaft or otherwise suitably secured thereto, the peripheral edge of the blade terminating in an integral upstanding flange 38 substantially extending at right angles to the operating face of the blade, and adapted to form a cupped flight, whereby a greater amount of material is held on the elevating surface of the blade, substantially preventing its wedging between the blade and casing and overflow during its upward travel, tending to absorb the side thrust of the material, thereby reducing frictional contact with the casing wall, effecting a more uniform upward flow and consequent reduction in power requirements to effect elevation thereof throughout its length of travel.

As above stated, this construction lessens the packing down and resistance of the upward flow of material, especially at the point of pick-up, greatly increasing the efficiency of the device and consequent decrease in motive power requirements, and in addition greatly strengthens the spiral elevator blade.

It will be noted that the helicoid conveyer blade D mounted on vertical shaft 7 extends from the bottom of vertical casing 11 to a point substantially coincident with the lower edge of opening 37 and casing 32, and in order to prevent packing of the material at the upper end of said casing 11 and to insure its positive discharge through outlet opening 37, a helicoid blade section D' is mounted on shaft 7 adjacent its upper end terminating at a point substantially coincident with the upper edge of opening 37 and with its spiral flights extending in a direction opposite to those of blade D, and a pair of oppositely extending paddles 39 welded or otherwise suitably secured to shaft 7 intermediate the spiral blades D and D' and in alignment with opening 37. The paddle or paddles 39 may be integrally connected to the blade sections D and D' if desired. The conveyer elevator device forming the subject matter of this invention is designed for substantially universal use in connection with bulk products of varying weights and consistencies, and whether liquid or dry. Therefore, it may be further expedient to slightly vary the paddle structure in accordance with the operating requirements incident to such different materials without, however, in any wise departing from the principles of the invention.

In Fig. 3 there is shown a modified form of endless blade construction similar to that above described except that instead of the flange 38 being formed integrally with the blade, it is of detachable and angle iron construction, the vertical portion of said angle member constituting the flange 38a adapted to seat against the peripheral edge of the blade Da, the horizontal portion 39 contacting the under surface of said blade and firmly secured thereto by rivets 40 or other suitable fastening elements as desired, thereby admitting of expeditious replacement at small cost of the entire flange or such section as may become damaged or distorted through usage and increasing the life of the said elevating medium and reducing maintenance and replacement cost to a minimum.

To effect a further reduction in motive power requirements, the blade 7 is formed with short pitched flights which reduces to a minimum degree the upward incline of the path of travel of the material from the intake to the discharge conveyers.

While I have shown the shaft 7 as having its ends engaging stub shafts, it is to be understood that shaft 7 may be of integral construction throughout if desired.

Although I have shown the thrust bearing and associated pulley driving mechanism indicated as 12—24 at the upper end of casing 11 it is to be understood that in accordance with operating requirements it may be found necessary to mount this structure at the lower end of casing 11 which may be expeditiously accomplished without in any manner departing from the scope or principles of my invention.

While the helicoid blade D is shown as extending to opening 37 in some instances it is found expedient to terminate such blades at a point substantially midway of the height of the tubular casing 11.

A slightly modified form of paddle structure is illustrated in Fig. 4 wherein the paddles 39a are formed with perforations 39b, the lower end of one of the paddles being integrally connected to the upper end of conveyer blade D as at 42 which form is especially adaptable for use in connection with the heavier products such as, for instance, dry phosphate, cement, ochre, flour, clay and the like, having an average weight of 35 to 100 pounds per cubic foot.

A slightly different form is illustrated in Fig. 5 wherein paddles 39c are each formed with a series of spike sections and which form is especially adapted for moist, gummy, sticky and dry or wet products such as acid phosphate, moist clay or any moist product having a cubic foot content weight of 25 to 150 pounds.

The form shown in Fig. 1 is more especially adaptable for the lighter products such as cotton seed, cotton seed meal, having an average cubic foot weight of 25 to 30 pounds, and in connection with even lighter weight, such as cotton seed hulls or similar products carrying average cubic foot weight of 5 to 25 pounds, one of the paddles may be omitted.

Although I have shown intake conveyer B and discharge conveyer C as extending at right angle with respect to vertical casing 11 it is to be understood that if desired the conveyers 29 and 33 may be removed and casings 25 and 32 connected to said casing 11 at an angle with respect thereto, whereby the material may be delivered to conveyer A through said casing 25 by gravity and similarly discharged therefrom through casing 32 without departing from the spirit of my invention.

From the above, it is apparent that I have not only designed a conveyer elevator, embodying a cupped pick-up short pitched flight conveyer adapted to receive the material from the intake conveyer and uniformly deliver it to the discharge conveyer or with less contact with the casing wall during its upward travel, and consequent reduction of frictional wear of both blade and casing, at the same time preventing the material falling therebetween, but also a conveyer structure for delivery from opposite directions, where desired, likewise a dual feed at point of discharge from said elevator, whereby a positive delivery and discharge is effected and jamming and packing of the material is prevented, and additional means for breaking up or pulverizing such material at point of discharge which structure materially contributes to a reduction in motor power per volume of flow.

Although in practice I have found that the form of my invention illustrated in the accompanying drawings and referred to in the above description as the preferred embodiment, is the most efficient and practical; yet realizing the conditions will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A granular elevator including a vertical tubular casing having intake and discharge openings, means for delivering material to said elevator through said intake opening, a shaft journaled in said vertical casing, a spiral elevator blade section carried by said shaft intermediate the intake and discharge openings, a reversed spiraled section carried by said shaft intermediate the upper end and discharge opening, and a plurality of radially extending blades interconnecting said spiral sections in longitudinal alignment with said discharge opening, said blades having means for permitting limited passage of material therethrough, whereby the elevation of the material above said opening is prevented, and positive discharge thereof through said opening is effected.

2. An elevator for granular and liquid materials comprising in combination a vertical tubular casing having an intake opening adjacent its lower end and a discharge opening adjacent its upper end, a shaft journaled in said vertical casing, a spiral cupped flight elevator blade section carried by said shaft and with its cupped end terminating at a point coincident with the lower edge of said outlet opening, a reversed spiralled blade section carried by said shaft intermediate the upper end and discharge opening and cooperating with said cupped section, and a plurality of radially extending blades intermediate said spiral sections in longitudinal alignment with said discharge opening, and means for delivering material through said intake opening and from said discharge opening.

3. An elevator for granular and liquid material including a vertical tubular casing having intake and discharge openings, means for delivering material to said elevator through said intake opening, a shaft journaled in said vertical casing, a spiral cupped flight elevator blade section carried by said shaft terminating at its upper end coincident with the lower edge of said discharge opening, a reversed spiraled section carried by said shaft intermediate the upper end and discharge opening cooperating with said cupped section, a plurality of radially extending blades interconnecting the spiral sections in longitudinal alignment with said discharge opening and having means for permitting limited passage of material therethrough, and means for delivering said material from the discharge opening, whereby the cupped flight prevents congestion at point of pickup, the reversed flight prevents jamming of material at the upper end of the casing and the paddles effect a positive discharge through said discharge opening.

4. An elevator for granular and liquid materials comprising in combination a vertical tubular casing having an intake opening adjacent its lower end and a discharge opening adjacent its upper end, a shaft journaled in the vertical casing, a spiral cupped flight elevator blade section carried by said shaft extending from the bottom of the casing to a point coincident with the lower edge of said discharge opening for elevating the material to the said opening and preventing congestion of material at point of pickup, a reversed spiraled blade section mounted on said shaft extending from the upper end of said casing to the upper edge of the discharge opening for maintaining the elevated material at such point, and means interconnecting said spiral section in longitudinal alignment with said discharge opening, said means adapted to permit limited passage of material therethrough and effect positive discharge of the material through said discharge opening.

This specification signed this 23d day of July, A. D., 1930.

J. O. BAILEY.